(12) United States Patent
Zakrzewski et al.

(10) Patent No.: US 9,559,818 B2
(45) Date of Patent: Jan. 31, 2017

(54) COMMUNICATIONS TERMINAL AND METHOD

(71) Applicant: SCA IPLA HOLDINGS INC, New York, NY (US)

(72) Inventors: Robert Zakrzewski, Bristol (GB); Milos Tesanovic, Swindon (GB)

(73) Assignee: SCA IPLA HOLDINGS INC, New York, NY (US)

( * ) Notice: Subject to any disclaimer, the term of this patent is extended or adjusted under 35 U.S.C. 154(b) by 111 days.

(21) Appl. No.: 14/373,776

(22) PCT Filed: Jan. 25, 2013

(86) PCT No.: PCT/GB2013/050168
§ 371 (c)(1),
(2) Date: Jul. 22, 2014

(87) PCT Pub. No.: WO2013/114086
PCT Pub. Date: Aug. 8, 2013

(65) Prior Publication Data
US 2015/0029967 A1    Jan. 29, 2015

(30) Foreign Application Priority Data

Jan. 31, 2012 (GB) .................................. 1201658.0
Jan. 31, 2012 (GB) .................................. 1201659.8

(51) Int. Cl.
*H04W 4/00* (2009.01)
*H04L 5/00* (2006.01)
(Continued)

(52) U.S. Cl.
CPC ............ *H04L 5/0032* (2013.01); *H04W 16/24* (2013.01); *H04W 24/08* (2013.01); *H04W 72/04* (2013.01);
(Continued)

(58) Field of Classification Search
CPC .. H04W 76/025; H04W 72/04; H04W 72/042; H04W 72/085; H04W 76/02; H04W 16/24; H04W 24/08; H04W 36/18; H04W 36/28; H04W 92/20; H04W 88/02; H04L 5/0032
(Continued)

(56) References Cited

U.S. PATENT DOCUMENTS 8,615,239 B2   12/2013 Fujito
2006/0172739 A1  8/2006 Wigard et al.
(Continued)

FOREIGN PATENT DOCUMENTS

CN   101594644    2/2009
EP   2 187 664    5/2010
(Continued)

OTHER PUBLICATIONS

U.S. Appl. No. 14/373,761, filed Jul. 22, 2014, Zakrzewski, et al.
(Continued)

Primary Examiner — Mang Yeung
(74) Attorney, Agent, or Firm — Oblon, McClelland, Maier & Neustadt, L.L.P.

(57) ABSTRACT

A mobile communications network includes a core network including infrastructure equipment, and a radio network including plural base stations configured to provide a wireless access interface for communicating data to/from communications terminals. One base station can operate as a serving base station to one of the communications terminals, to establish one or more communications bearers for communicating user data to/from the communications terminal via the core network and the radio network, and co-operate with at least another of the base stations to communicate the user data to/from the communications terminal. The mobile communications network can monitor a state of a radio
(Continued)

communications channel between the co-operating base station and the communications terminal, and upon predetermined conditions, establish a communications bearer from the core network to the co-operating base station for communicating the user data to the co-operating base station for transmitting the user data to the communications terminal.

12 Claims, 7 Drawing Sheets

(51) Int. Cl.
| | |
|---|---|
| *H04W 76/02* | (2009.01) |
| *H04W 24/08* | (2009.01) |
| *H04W 72/04* | (2009.01) |
| *H04W 72/08* | (2009.01) |
| *H04W 16/24* | (2009.01) |
| *H04W 36/18* | (2009.01) |
| *H04W 36/28* | (2009.01) |
| *H04W 92/20* | (2009.01) |
| *H04W 88/02* | (2009.01) |

(52) U.S. Cl.
CPC ......... *H04W 72/042* (2013.01); *H04W 72/085* (2013.01); *H04W 76/02* (2013.01); *H04W 76/025* (2013.01); *H04W 36/18* (2013.01); *H04W 36/28* (2013.01); *H04W 88/02* (2013.01); *H04W 92/20* (2013.01)

(58) Field of Classification Search
USPC .................................. 370/331; 455/436–449
See application file for complete search history.

(56) References Cited

U.S. PATENT DOCUMENTS

| | | |
|---|---|---|
| 2008/0020768 A1 | 1/2008 | Li et al. |
| 2008/0076436 A1 | 3/2008 | Sanders et al. |
| 2009/0305706 A1* | 12/2009 | Tomizu ............ H04W 36/0055 455/442 |
| 2011/0075634 A1* | 3/2011 | Maruyama ........ H04W 36/0055 370/331 |
| 2011/0143793 A1* | 6/2011 | Kim ....................... H04B 7/024 455/501 |
| 2011/0270994 A1 | 11/2011 | Ulupinar et al. |

FOREIGN PATENT DOCUMENTS

| | | |
|---|---|---|
| GB | 2485235 | 5/2012 |
| WO | WO 2011/020062 A2 | 2/2011 |
| WO | 2011/078330 | 6/2011 |
| WO | 2011/100492 | 8/2011 |

OTHER PUBLICATIONS

International Search Report issued Apr. 5, 2013 in PCT/GB13/050168 filed Jan. 25, 2013.

Great Britain Search Report issued Aug. 13, 2012 in United Kingdom Patent Application No. GB1201659.8 filed Jan. 31, 2012.

Ericsson, et al. "Stage-2 description of relaying into 36. 300", 3GPP TSG-RAN WG2 Meeting #69bis, R2-102659, XP050422824, Apr. 28, 2010 (23 Pages).

Harri Holma. et al., "LTE for UMTS OFDMA and SC-FDMA Based Radio Access", LTE, pp. 25-27, Apr. 2009.

Japanese Office Action issued Jul. 26, 2016 in corresponding Application No. 2014-555303 (6 pages).

* cited by examiner

COMMUNICATIONS TERMINAL AND METHOD

CROSS-REFERENCE TO RELATED APPLICATIONS

The present application is based on PCT filing PCT/GB2013/050168 filed Jan. 25, 2013, and claims priority to British Patent Application 1201659.8, filed in the UK IPO on 31 Jan. 2012 and British Patent Application 1201658.0, filed in the UK IPO on Jan. 31, 2012, the entire contents of each of which being incorporated herein by reference.

FIELD OF THE INVENTION

The present invention relates to mobile communications networks for communicating data to and/or from communications terminals, infrastructure equipment, communications terminals and methods of communicating.

BACKGROUND OF THE INVENTION

Mobile communication systems have evolved over the past ten years or so from the GSM System (Global System for Mobiles) to the 3G system and now include packet data communications as well as circuit switched communications. The third generation project partnership (3GPP) has now began to develop a mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

It is known within the 3GPP standards, such as the LTE standards to provide a co-operating set of a plurality of base stations which co-operate in order to communicate data to a communications terminal. The co-operating set of base stations includes a serving base station and at least one co-operating base station. The serving base station is a base station to which the communications terminal is attached in the sense that control and signalling of radio bearers are established with the serving base stations as well as the S1-U and S1-MME connections with the serving gateway and mobility manager via the serving base station respectively. The serving base station is typically configured to control the communication of the user data to the co-operating base station via an interface between the serving base station and the co-operating base station. The serving base station can then control the communication of user data selectively to the communications terminals from either the serving base station or the co-operating base station or both depending on a state of a radio communications link between the co-operating base station and the communications terminals and the radio communication techniques which are used to form the wireless access interface between the base stations and the communications terminals.

As will be appreciated it is generally desirable to provide a mobile communications system and network which can operate efficiently in order to optimise the use of communications resources and infrastructure equipment.

SUMMARY OF THE INVENTION

According to the present invention there is provided a communications terminal for communicating data to or receiving data from a mobile communications network. The mobile communications terminal is configured to establish in co-operation with the mobile communications network a communications bearer for communicating data for a communications session from or to the mobile communications device via the communications bearer, the communications bearer including a radio communications channel between the communications terminal and a serving base station of the mobile communications network, and to receive the data from a serving base station of the mobile communications network via a radio communications channel between the serving base station and the communications terminal, wherein the serving base station forms with at least one other co-operating base station a co-operating set. The communications terminal is configured to determine a state of the radio communications channel between the serving base station and the communications terminal and between the co-operating base station and the communications terminal, to communicate the determined state of the radio communications channel between the serving base station and the co-operating base station and the communications terminal to the serving base station, to receive the user data selectively from one or both of the serving base station or the co-operating base station consequent upon the communicated state of a radio communications channel established via the wireless access interface under the control of the serving base station, and consequent upon predetermined conditions, to receive the user data from the co-operating base station, which has been communicated to the co-operating base station using a communications bearer established from the core network to the co-operating base station for communicating the user data to the co-operating base station for transmitting the user data to the communications terminal.

According to an aspect of the present invention there is provided a mobile communications network for communicating data to and/or from one or more communications terminals. The mobile communications network comprises a core network part including infrastructure equipment, and a radio network part including a plurality of base stations which are configured to provide a wireless access interface for communicating the data to or from the communications terminals. One of the plurality of base stations is configured to operate as a serving base station to one of the communications terminals, to establish in co-operation with the communications terminal one or more communications bearers for communicating user data to or from the communications terminal via the core network part and the radio network part via the serving base station, and to co-operate with at least one other of the plurality of base stations to communicate the user data to or from the communications terminal. The co-operating base station is configured to receive user data for communicating to the communications terminal via an interface between the serving base station and the co-operating base station, and to transmit the user data selectively to the communications terminal consequent upon a state of a radio communications channel established via the wireless access interface under the control of the serving base station. The mobile communications network is configured to monitor a state of the radio communications channel between the co-operating base station and the communications terminal, and consequent upon predetermined conditions, to establish a communications bearer from the core network to the co-operating base station for communicating the user data to the co-operating base station for transmitting the user data to the communications terminal. Accordingly, a bandwidth requirement of the interface between the serving base station and the co-operating base station can be reduced.

Embodiments of the present invention find application with a co-operating set of a plurality of base stations which co-operate in order to communicate data to a communications terminal, the co-operating set of base stations including a serving base station and at least one co-operating base station. The serving base station is typically a base station through which the communications terminal is currently attached to the mobile communications network and typically is a base station through which the communications terminal has either established one or more communications bearers which are used to communicate user data to or from the communications terminal or is a base station to which the communications terminal has handed over. The serving base station is typically configured to control the communication of the user data to the co-operating base station via an interface between the serving base station and the co-operating base station. The serving base station can communicate the user data to the co-operating base station and then control the communication of user data selectively to the communications terminals from either the serving base station or the co-operating base station or both depending on the state of a radio communications link between the co-operating base station and the communications terminals and the radio communication techniques which are used to form the wireless access interface between the base stations and the communications terminals.

For the example implementation of the Long Term Evolution (LTE) standards being developed by 3GPP, the interface between the serving base station and the co-operating base station is known as the X2 interface. However if there are many mobile stations which are transmitting or receiving data using the same co-operating set of base stations then because the interface between the serving base station and the co-operating base station (X2 interface) must carry scheduling assignments for transmitting the user data, control information as well as the user data to be communicated then the interface can become congested because of a limited bandwidth of the interface which is available.

Embodiments of the present invention have therefore been devised so as to reduce and to relieve a burden on the interface between the base stations of a co-operating set of base stations. Accordingly depending on predetermined conditions being satisfied, which can include a state of the radio link between the co-operating base station and the communications terminal provided by the wireless access interface, embodiments of the present invention are arranged to establish a communications bearer from the core network to the co-operating base station (referred to for brevity as a sub-bearer) for communicating the user data to the co-operating base station without going through the serving base station. Therefore, there can be no need to communicate the user data on the interface between the serving base station and the co-operating base station and accordingly congestion on the interface between the serving base station and the co-operating base station is reduced. As will be appreciated, if many communications terminals are being served by a co-operating set of base stations then by providing a separate communications bearer from the core network to each of the co-operating base stations for communicating the user data to the co-operating base stations rather than only the serving base station then a bandwidth of the interface between the serving base station and the co-operating base stations can be reduced. The interface can then be used to communicate scheduling assignments for the communication of the user data from the co-operating set of base stations in accordance with the radio communications channel as would be performed conventionally. Therefore in some embodiments, after the communications bearer between the serving gateway and the co-operating base stations has been established, the serving base station may stop transmitting the user data of the selected communications bearer via the interface between the serving base station and the co-operating base station.

In some example embodiments the sub-bearer from the serving gateway to the co-operating base station may be established without first communicating the user data to the serving base station and to the co-operating base station via the interface between the serving and co-operating base stations. In this example a control element in the network could be a mobility manager, which decides to establish the sub-bearer from the serving gateway to the co-operating base station based on notifications from the serving base station. For the example of LTE, the X2 is normally configured in the system even when not used. In some situations there might be no X2 interface. However it is possible to relay signalling to another base station over the S1 interface and so a co-operating set of base stations may still be possible for example when communications terminals are stationary and the radio communications link does not exercise excessive variability. The transmission could be a simultaneous multi-point transmission. Transmission from one base station at a time makes little sense because when the communications terminal is nomadic, the S1 based handover can be used although it may be considered better to maintain the co-operating set with the current serving base station to utilise gains from switching and macro diversity.

Various further aspects and features of the present invention are defined in the appended claims, which include a communications terminal, an infrastructure equipment and method.

Suggestion

BRIEF DESCRIPTION OF THE DRAWINGS

Example embodiments of the present invention will now be described with reference to the accompanying drawings in which like parts have the same designated references and in which.

DESCRIPTION OF EXAMPLE EMBODIMENTS

Figure 1:
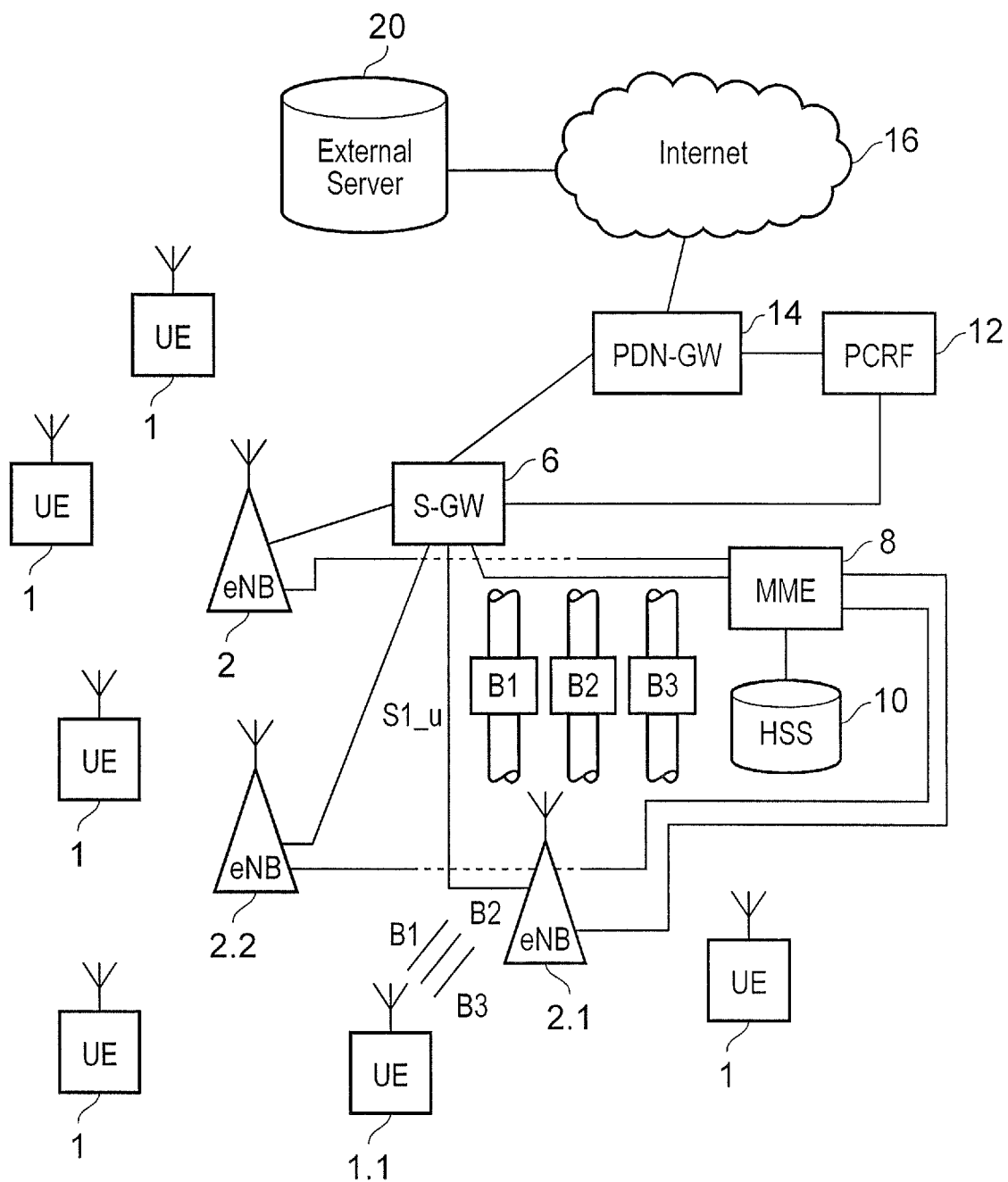
FIG. 1 is a schematic block diagram of a mobile radio network and mobile communications devices forming a communication system which operates in accordance with the 3GPP Long Term Evolution (LTE) standard.

Embodiments of the present invention will now be described with reference to an implementation which uses a mobile communications network operating in accordance with the 3GPP Long Term Evolution (LTE) standard. FIG. 1 provides the example architecture of an LTE network. As shown in FIG. 1 and as with a conventional mobile communications network, communications terminals (UE) 1 are arranged to communicate data to and from base stations 2 which are referred to in LTE as enhanced NodeBs (eNB). For transmitting and receiving data via the wireless access interface the communications terminals 1 each include a transmitter/receiver unit 3.

The base stations or eNB's 2 are connected to a serving gateway S-GW 6 which is arranged to perform routing and management of mobile communications services to the communications terminals 1 as they roam throughout the mobile radio network. In order to maintain mobility management and connectivity, a mobility management entity (MME) 8 manages the enhanced packet service (EPS) connections with the communications terminals 1 using subscriber information stored in a home subscriber server (HSS) 10. Other core network components include the policy charging and resource function (PCRF) 12 a packet data gateway (P-GW) 14 which connects to an internet network 16 and finally to an external server 20. More information may be gathered for the LTE architecture from the book entitled "*LTE for UMTS OFDM and SC-FDMA based radio access*", Holma H. and Toskala A. page 25 ff.

In the following description LTE/SAE terminology and names are used. However embodiments of the present technique can be applied to other mobile communications systems such as UMTS and GERAN with the GPRS core network.

As shown in FIG. 1 communications terminals 1 can roam throughout the mobile communications network and as with a conventional operation attach to base stations (eNB's) 2 in order to transmit and receive data via the wireless access interface provided by the base stations 2. Thus, a communications terminal 1 once attached to a base station 2 may establish one or more communications bearers for transmitting or receiving user data. Thus, as shown in FIG. 1 one of the communications terminals 1.1 has established three radio access bearers B1, B2, B3 for transmitting and receiving user data. The communications bearers B1, B2, B3 may be provided to different application programs providing services to a user of the communications terminal 1.1. Each of the bearers B1, B2, B3 may be operating in accordance with a pre-determined quality of service for communicating the data via the respective communications bearer.

As with a conventional operation the communications terminal 1.1 may detach from the base station 2.1 and re-attach to a target base station 2.2 in accordance with a conventional handover operation because a signal quality of a radio communications channel provided by the target base station 2.2 has become better than that available from the source base station 2.1.

Co-Operating Set of Base Stations

It is known within some example mobile communications networks, such as the 3PP standards, for example, LTE, to provide a co-operating set of base stations. A co-operating set of base stations comprises at least a serving base station and at least one other co-operating base station. The co-operating set of base stations utilises an interface between the base stations. For the example of the LTE standard this interface is known as the X2 interface. In accordance with one example the communications terminal 1.1 shown in FIG. 1 is again being provided with three communications bearers B1, B2, B3 for communicating data which maybe in accordance with different quality of service requirements.

Figure 2:
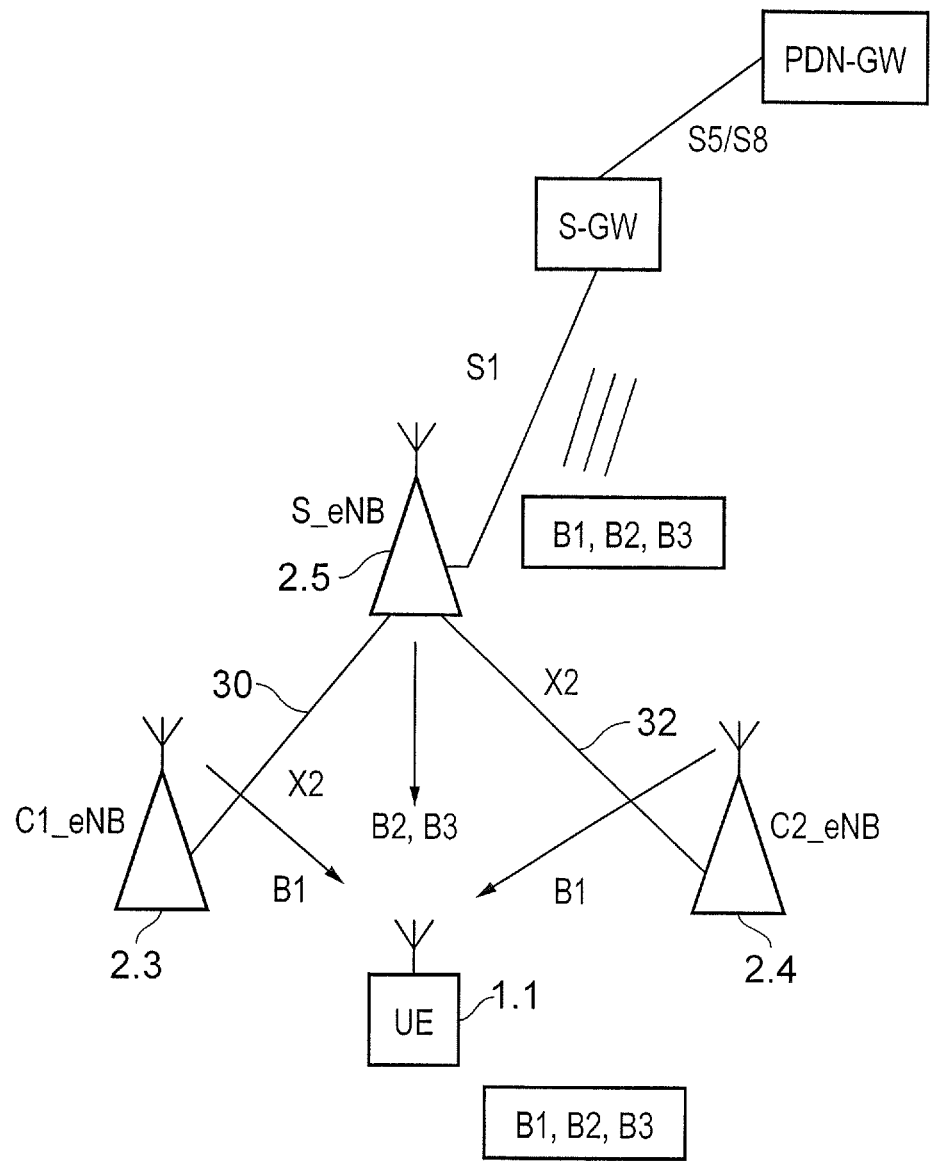
FIG. 2 is a schematic block diagram illustrating the operation of the mobile communications network shown in FIG. 1 when configured to operate with a co-operating set of base stations.

As shown in FIG. 2 in accordance with an arrangement of a co-operating set two co-operating base stations (C1-eNB, C2-eNB) 2.3, 2.4 combine with a serving base station (S-eNB) 2.5 to communicate user data to and/or from the communications terminal 1.1. To this end, the serving base station 2.5, in one example, is monitoring a condition of radio communications between the communications terminal 1.1 and the first and second co-operating base stations 2.3, 2.4 and the serving base station 2.5. In accordance with a state of the radio communications link between the respective base stations of the co-operating set 2.3, 2.4, 2.5, the serving base station 2.5 selects either the serving base station 2.5, the first co-operating base station 2.3 or the second co-operation base station 2.4 to communicate the user data via a particular one of the communications bearers. So for the example of the communications bearer B1, the co-operating base stations 2.3, 2.4 have been selected to communicate the user data to provide the communications bearer B1 because of a current state of the radio communications link and in one example in combination with a quality of service requirement for the first communications bearer B1. In contrast the serving base station 2.5 may continue to communicate user data via the second and third bearers B2, B3 again perhaps because of a quality of service requirement for those communications bearers B2, B3. For example, the quality of service for the communications bearers B2, B3 may require a low data rate and be delay tolerant. Accordingly, a quality of a radio communications channel for communicating the data on the B2 and B3 communications bearer may be lower so that it is not necessary to use additional diversity provided by the co-operating base stations 2.3, 2.4.

For the example in which the user data communicated via the first communications bearer B1 is provided either one or both of the first or the second co-operating base stations 2.3, 2.4, then the user data is conventionally communicated via the X2 interfaces 30, 32 to the respective first and second co-operating base stations 2.3, 2.4. Also communicated with the user data is scheduling and assignment information so that the co-operating base stations know when they are to transmit the user data via the wireless access interface to the communications terminal 1.1. In other examples, the user data maybe communicated from both the serving base station 2.5 as well as the first and second co-operating base stations 2.3, 2.4 which may then be combined at the communications terminal 1.1 depending on radio communications techniques which are employed for communicating user data via the physical radio link layer of the wireless access interface provided by the base stations. For the example of OFDM, as proposed for LTE, the radio signals can be combined constructively at the communications terminal, which have been received from both the serving base station 2.5 and the co-operating base station 2.3, 2.4.

As will be appreciated for the present example embodiment the communication of the user data to the communications terminal 1.1 from one of the base stations in the co-operating set is controlled by the serving base station 2.5 in the co-operating set. Control of the communication of the user data is by communicating scheduling assignment indications to respective co-operating base stations 2.3, 2.4 from the serving base station 2.5, the scheduling assignment indications being communicated via the interface between the serving base station and the co-operating base stations (for example, X2 interface).

As a number of communications terminals which are receiving user data via the co-operating set of base stations shown in FIG. 2 increases, then an amount of user data which must be communicated via the X2 interface 30, 32 between the base stations will increase. Thus the interfaces between the base stations 30, 32 must communicate not only user data but the scheduling assignments of transmission of the user data as well as control information and signalling. As the number of communications terminals increases a capacity of the interfaces 30, 32 between the base stations must increase or alternatively given that the X2 interface will have a fixed bandwidth for the interfaces 30, 32, a limit will be reached for a number of communications terminals which can be supported by the co-operating set, before congestion of the communication of data via the interfaces between the base stations results. This technical problem is addressed by the example embodiments herein described.

Example of Adapted Co-Operating Set

Example embodiments of the present technique can provide an arrangement for relieving congestion on an interface (e.g. X2 interface) between a serving base station and a co-operating base station which form a co-operating set of base stations for communicating user data to a communications terminal. To this end, one of the serving base station or other parts of the mobile communications network is arranged to monitor the quality of radio communications link between the communications terminal and the serving base station and between the co-operating base station and the communications terminal. Depending on a relative quality of the radio communications link, the mobile communications network is arranged to communicate the user data via either the co-operating base station or the serving base station or in some cases both. However, as explained above, in order to reduce an amount of bandwidth consumed by communicating the user data between the serving base station and the co-operating base station on the interface between them, a separate communications bearer (referred to in the following description as a sub-bearer) can be established from, for example, a serving gateway of the core network to the co-operating base station for communicating user data directly to the co-operating base station, instead of, or as well as the serving base station. As such the user data does not need to be communicated via the interface between the serving base station and the co-operating base station.

The establishment of the separate sub-bearer between the serving gateway and the co-operating base station can be dependent on a relative cost function of the overheads of establishing the separate communications bearer to the co-operating base station with respect to an amount of user data communicated to the communications terminal from the co-operating base station. As will be appreciated, therefore, this determination can depend on a relative amount of time for which the co-operating base station provides a better radio communications link for communicating the user data to the communications terminal rather than communicating the user data from the serving base station.

As will be appreciated if the co-operating base station provides only short intermittent periods for which the radio communications channel is better than the serving base station then only a small amount of user data will occasionally be communicated to the communications terminal via the co-operating base station and so it may not be efficient to establish the sub-bearer from the serving gateway to the co-operating base station compared with an amount of signalling and a time required to establish the communications bearer to the co-operating base station. However, if the amount of time for which the co-operating base station is providing a better radio communications link than the serving base station is longer than the time required to establish the sub-bearer to the co-operating base station from the serving gateway then it may be a more efficient to communicate the user data separately and directly to the co-operating base station.

In some examples, if the co-operating base station is providing a better radio communications channel for a significant time which is better than the serving base station then there may become a point at which it would be better for the communications terminal to hand over to the co-operating base station so that that co-operating base station then becomes the serving base station. However, even if the time for which the co-operating base station provides a better radio communications link quality than the serving base station is greater than a time for which a handover typically would be performed, it may make sense not to handover. Sub-bearers can be established to all co-operating base stations in a co-operating set from the S-GW. In accordance with signalling, such as in-band signalling, transmission may be switched between base stations or alternatively user data may be transmitted simultaneously to all of the base stations in the co-operating set. Handover may be performed but for example only one S1 communications bearer may be handed over between the S-GW and serving base station, so that handover criteria may be modified. Therefore even when a time for which the radio communications quality to the co-operating base station is better than the serving base station is greater than a typical handover time, it may make sense to maintain the serving base station as the point of attachment for the communications terminal, and maybe only to make a co-operating base station the serving base station if the radio quality for all bearers is better for a greater predetermined time at the co-operating base station. Thus handover may not be executed even if a time for which the radio channel quality exceeds that for which a handover would be typically executed because it is possible to benefit from macro diversity as switching time will always be shorter than handover. As such, by transmitting from all base stations it may be possible to transmit from all base stations a communications terminal can combine signals which are multi-cast from the co-operating base stations.

In other examples, the relative merits of establishing a separate communications bearer (sub-bearer) between the serving gateway and the co-operating base station for communicating the user data rather than via the interface between the serving base station and the co-operating base station will depend on a relative quality or service which is required for the communication of the user data.

Figure 3:
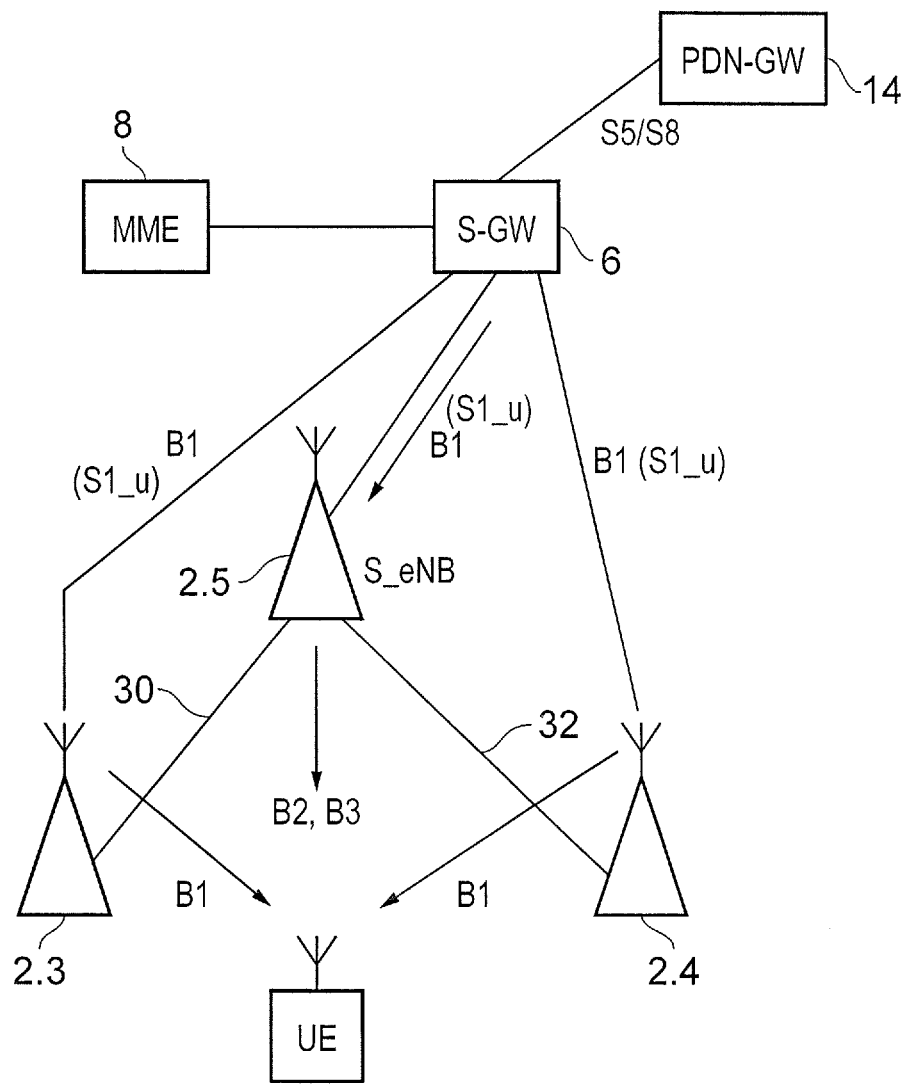
FIG. 3 is an example embodiment of the present technique in which a separate communications bearer is established from the serving gateway to one of the co-operating base stations of the co-operating set shown in FIG. 2.

FIG. 3 provides a schematic block diagram of the co-operating set of base stations shown in FIG. 2 that has been adapted in accordance with the present technique. More specifically according to one example the mobile communications network is adapted to provide a separate communications bearer for conveying user data to one or both of the co-operating base stations 2.3, 2.4 without going through the serving base station 2.5 and the X2 interface. The separate communications interface (e.g. X2) 30, 32 therefore fulfils the requirement for the communications bearer B1 via the S1_u interface between the serving gateway 6 and a first of co-operating base stations 2.3 and the second co-operating base stations 2.4. In accordance with the present technique the mobile communications network assesses whether it would be more efficient in terms of communication resources used and time taken to establish a separate communications bearers with respect to a stability of the radio communications link between the co-operating base stations 2.3, 2.4 and the communications terminal 1.1.

To assist in the clarity of the description of the embodiments described below, the description will be given for the example in which one of the co-operating base station 2.3 is used to communicate user data to the communications terminal 1.1. However, it will be appreciated that the following description can be applied to other co-operating base stations 2.4 or indeed could be applied to all of the base stations in the set.

According to the present technique in order to reduce a burden on an interface between the serving base station 2.5 and the co-operating base stations 2.3, 2.4 via for example the X2 interface according to the LTE Standard, the present technique arranges for a separate communications bearer to be established between the serving gateway 6 and one or more of the co-operating base stations 2.3, 2.4 via the S1_u interface. Thus through the example shown in FIG. 2 in which user data for the communications bearer B1 is communicated via the co-operating base stations 2.3, 2.4 a separate bearer is established between the serving gateway 6 and the co-operating base station 2.3 and/or the second co-operating base station 2.4. Accordingly the user data does not pass through the B1 communications bearer from the serving base station 2.5 to the co-operating base stations 2.3, 2.4 via the X2 interface 30, 32. Accordingly an amount of communications bandwidth used on the interface between the base stations of the co-operating set is correspondingly reduced. However, in some examples the X2 will continue to be used to communicate signalling and scheduling information.

As mentioned above, for clarity in the following explanation the separate communications bearer which is established between the serving gateway 2.3 and a co-operating base station of the co-operating set for conveying the user data in accordance with a communications bearer to the communications terminal will be referred to as a "sub-bearer". For the present example the sub-bearer conveys the data for fulfilling the communications bearer B1 for communicating user data via the co-operating base station 2.3, 2.4. However, this sub-bearer is also via the S1_u interface between the serving gateway 6 and the co-operating base station 2.3 and otherwise represents a communications bearer which would be established between the serving gateway 6 and any other base station 2.

As mentioned above there is essentially a cost function associated with establishing the separate communications bearer between the serving gateway 6 and the co-operating base station 2.3 to convey the user data in accordance with the communication bearer B1. The cost is a function of the time taken to establish the sub-bearer and the communications resources. Therefore the cost function for establishing the sub-bearer B1 is in terms of signalling and communications bandwidth and delay in establishing the sub-bearer. As such, there will be a trade-off between a time to establish the sub-bearer, a communications resource required to establish the sub-bearer and a time for which the sub-bearer B1 will be useful because the sub-bearer B1 is only useful when a radio communications channel between the co-operating base station 2.3 and the communications terminal 1.1 provides a better quality than that from the serving base station 2.5. The following section provides an example explanation of how this determination is made. In one example the decision to establish to establish the sub-bearer is done by the mobility management entity (MME) 8 based on reports of radio link quality measurements from the serving station 2.5. To this end a diagram illustrating the flow of signalling in the co-operating set of base stations for one example is shown in FIG. 4.

Figure 4:
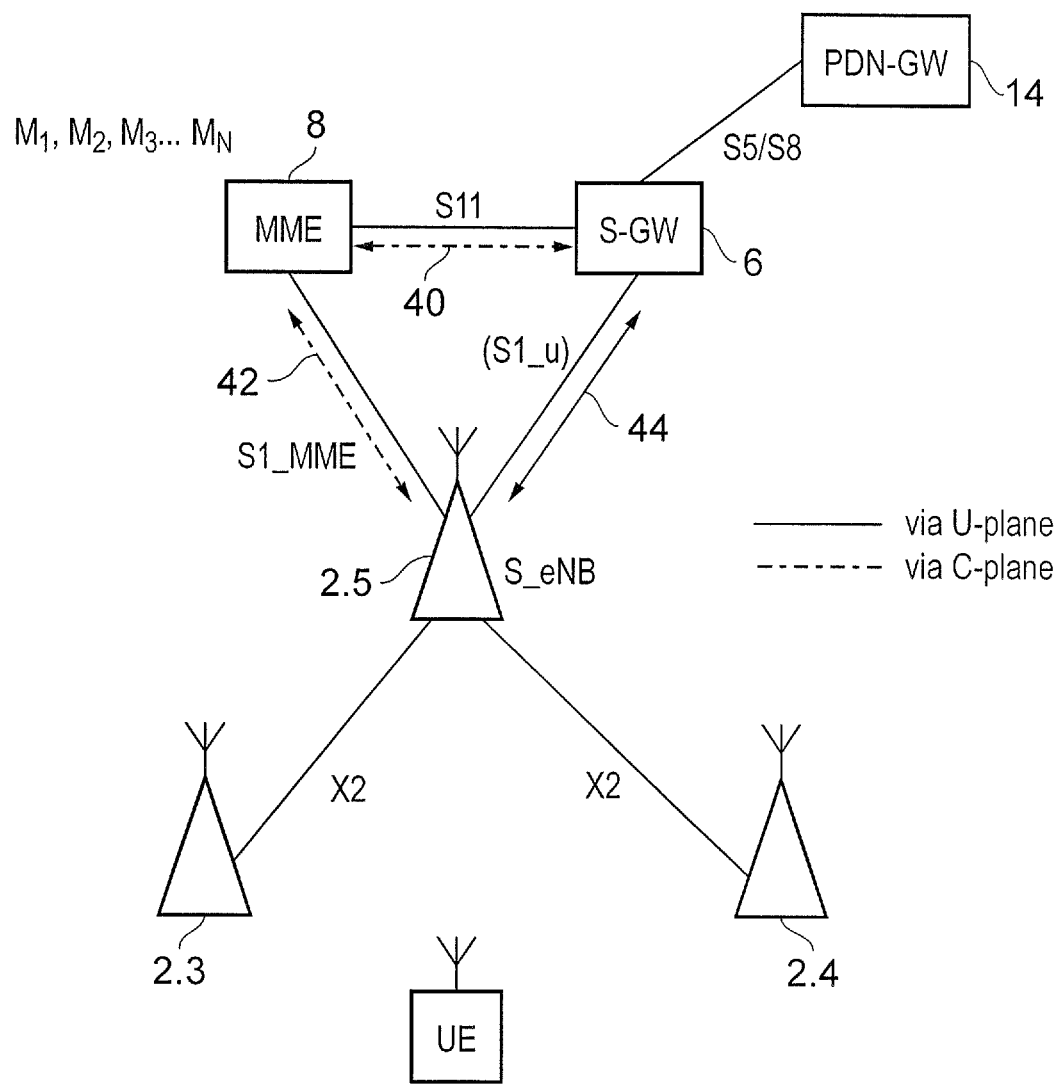
FIG. 4 is a schematic block diagram illustrating a flow of signalling messages from a serving base station to a serving gateway and a mobility manager for the co-operating set of base stations shown in FIG. 3.

In FIG. 4 a schematic block diagram is provided of the co-operating set of base stations which reflects the arrangement shown in FIG. 3 but has been provided to illustrate the signalling requirements in order to make a determination as to whether or not the sub-bearer B1 should be established. As shown in FIG. 4 the serving base station 2.5 collects information relating to a relative quality of a current radio communications between the co-operating base stations 2.3, 2.4 and the mobile communications terminal 1.1 as well as a quality of the radio communications between the serving base station 2.5 and the communications terminal 1.1. Conventionally, this information is only used to control the communication from the co-operating base station 2.3. The measurement reports are communicated to the MME 8. Then, in accordance with pre-determined criteria the MME 8 then establishes the S1_u sub-bearers between the serving gateway 6 and the co-operating base station 2.3. The pre-determined conditions include at least a relative quality of the radio communications links between the co-operating base stations 2.3, 2.4 and the communications terminal 1.1 with respect to a quality of the radio communications links between the serving base station 2.5 and the communications terminal 1.1. The decision criteria will be explained in more detail in the following paragraphs with reference to FIGS. 5a, 5b and 5c.

Decision Criteria for Establishing Communications Sub-Bearers with Co-Operating Base Stations As will be understood from the description of the embodiments of the invention provided above determining whether to establish the separate communications bearer is a balance between the overheads required to establish the communications bearer with respect an efficiency which can be achieved from using the communications bearer instead of the interface between the base stations of the co-operating set. The balance of efficiency may depend therefore on a relative time for which a quality of the radio communications channel from the co-operating base station to the communications terminal is better than the radio communications channel between the serving base station and the communications terminal.

Figure 5A:
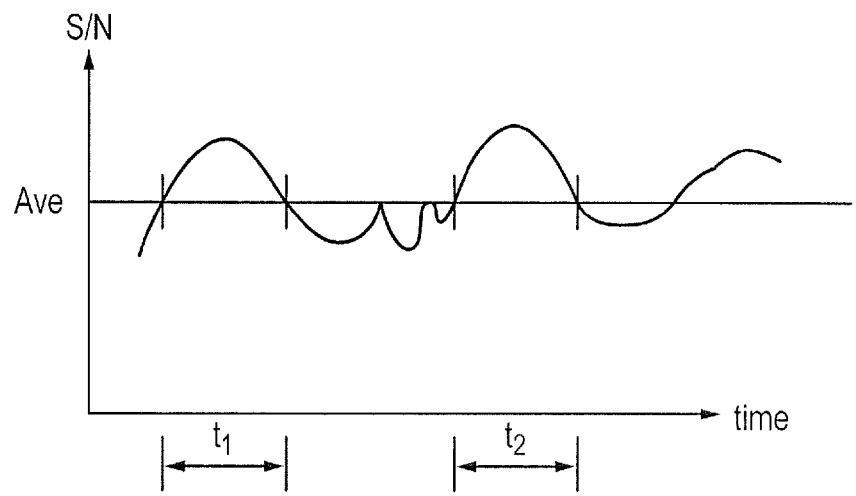
FIG. 5a is a graphical representation of a plot of signal noise ratio with respect to time for a co-operating base station showing a variation in radio channel quality.

FIG. 5a provides a graphical plot of signal to noise ratio with respect to time for a co-operating base station. As can be seen in FIG. 5a an average value of the signal to noise ratio is shown with respect to the plot in which for periods of t1 and t2 the signal to noise ratio exceeds the average value.

In one example the predetermined conditions or criteria for establishing the S1_u sub-bearer for the communications bearer B1 may include a determination of the rate of change of the signal to noise ratio, when this is below a predetermined value. If the signal to noise ratio is changing rapidly then the radio communications quality may not be at a level for a duration for which it will be worthwhile establishing the sub-bearer B1 from the serving gateway 6 to the co-operating base station 2.3. However, if the rate of change is slow enough, and the average signal to noise ratio is above a predetermined level, then it can be assumed that at some point the signal to noise ratio will remain above a value for which communications can be relied upon from the co-operating base station 2.3 to the communications terminal 1.1 rather than or in addition to the serving base station. This first example of the criteria for establishing the sub-bearer therefore represents a relatively coarse test of viability of the S1_u sub-bearer. Once the sub-bearer B1 has been established then the serving base station 2.5 continues to monitor the radio communications link quality from the co-operating base station 2.3 to the communications terminal 1.1. For the periods t1 and t2 shown in FIG. 5a, the user data can be communicated via the co-operating base station 2.3, for which the sub-bearer can be used from the serving gateway 6 to the co-operating base station 2.3, instead of or in addition to the communications bearer B1 from the serving gateway 6 to the serving base station 2.5.

As will be appreciated there may be a limit on an observation time for which the state of the radio communications channel can be observed to determine whether to establish the sub-bearer. This observation time may depend on the quality of service requirement for the communications bearer and also a confidence level required. The greater the observation time the greater is a confidence probability that the sub-bearer will be used efficiently compared with the saving on the interface between the serving base station and the co-operating base station.

Figure 5B:
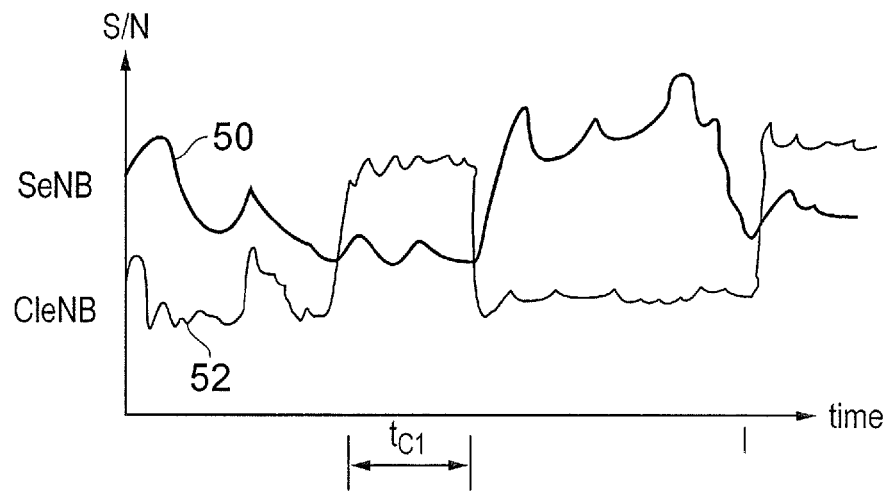
FIG. 5b is a graphical representation of a plot of signal to noise ratio with respect to time for a serving base station and a co-operating base station of the co-operating set illustrating a period in which the radio quality provided by the co-operating base station exceeds that of the serving base station.

A further example of determining the criteria for establishing the sub-bearer via the co-operating base station 2.3 is shown in FIG. 5b. In FIG. 5b a plot of signal to noise ratio with respect to time is shown for a serving base station and a co-operating base station 52. As shown in FIG. 5a the MME as shown in FIG. 4 may receive reports from the serving base station of the signal noise ratio of the serving base station and the co-operating base station 2.3, 2.4 with respect to time. As shown in FIG. 5b for a period tc1 the signal noise ratio of the radio communications channel between the co-operating base station 2.3, 2.4 and the communications terminal 1.1 exceeds that of the signal noise ratio between the serving base station 2.5 and the communications terminal 1.1. Therefore the periods tc1, tc2 for which the radio communications link quality is better via the co-operating base station 2.3, 2.4 are determined. If the time for which the communications quality via the co-operating base station 2.5 exceeds a set-up time for establishing the S1_u sub-bearer then the MME 8 concludes that it is worth establishing the sub-bearer B1 to the co-operating base station C1 eNB 2.3 and communicating the user data via the sub-bearer B1 from the serving gateway to the co-operating base station 2.3.

The measured time tc1 for which the radio link quality is better via the co-operating base station is compared with the set-up time for establishing the sub-bearer S1_u. The set-up time can be determined from a time taken to measure the signal to noise ratio from the co-operating base station 2.3 and the serving base station 2.5 to the communications terminal 1.1, a time to report this measurement to the MME 8 and a time to establish the sub-bearer S1_u. Thus, the set up time includes a time taken to acquire the measurements of the signal noise ratio from the serving base station 2.5 to the communications terminal 1.1 and from the co-operating base station 2.3 to the communications terminal 1.1, a time for communicating these measurements to the MME 8 and a time for the MME 8 to instruct the eNodeB and serving gateway 6 to establish the sub-bearer S1_u to the co-operating base station 2.3. If the time for which the radio communications link via the co-operating base station is greater than the sub-bearer set up time then it will be worth establishing the sub-bearer for communicating the user data directly to the co-operating base station 2.3 for transmission to the communications terminal 1.1.

In some examples the sample values of the signal to noise ratio between the serving base station 2.3 and the communications terminal 1.1 as well as the co-operating base station 2.3 and the communications terminal 1.1 maybe communicated via in band signalling via the communications bearer B1 on the S1 interface between the serving base station 2.5 and the serving gateway 6 or between the serving base station 2.5 and the MME 8.

Figure 5C:
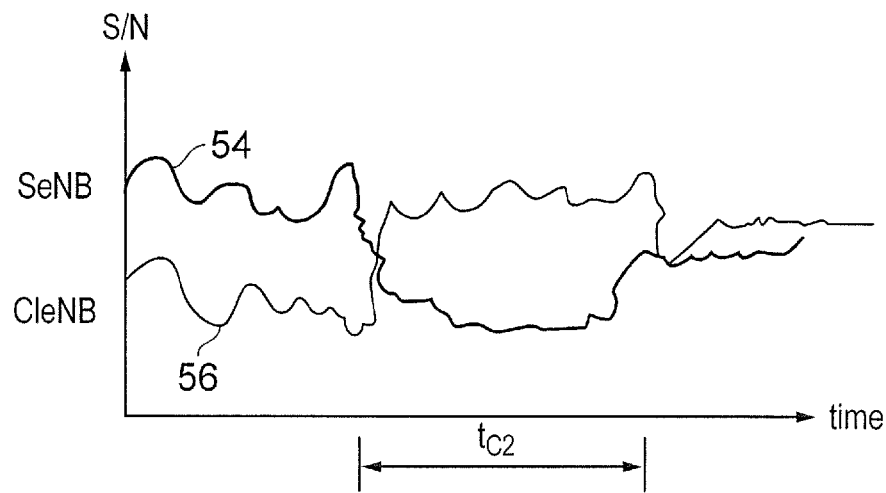
FIG. 5c is a corresponding plot to that shown in FIG. 5b providing an example in which a signal noise radio for the co-operating base station exceeds that of the serving base station for a time which would trigger a handover to the co-operating base station.

A further example illustration shown in FIG. 5c which provides a plot of signal to noise ratio with respect to time for the serving base station 54 and the co-operating base station 56. As shown in FIG. 5c for a period of tc2 the signal to noise ratio of the co-operating base station 2.3 exceeds that of the serving base station 2.5.

As will be appreciated there will be an optimum duration for which the signal to noise ratio provided from the co-operating base station exceeds that of the serving base station which is greater than the time required to set up the sub-bearer but less than a time for which handover can be executed for the communications terminal detaching from the serving base station as source base station and attaching to the co-operating base station as target base station. Thus, as shown in FIG. 5c the time tc2 is relatively long and given that this time exceeds a time for performing a handover then in this case the communications terminal or the mobile communications network, for example, the MME 8, may determine that the communications terminal 1.1 should handover to the co-operating base station 2.3. The time required to execute handover comprises a handover preparation time, a handover execution time and a handover completion time which includes the communication of signalling messages as well as reserving radio communications resources on the co-operating base station. If this total handover time is less than a time tc2 in which the co-operating base station provides a better radio communications link quality than the serving base station then the MME 8 may decide not to establish the sub-bearer B1 but to instruct the communications terminal to handover to the co-operating base station. In this case a sub-bearer for the communications bearer B1 will be established via the S1 interface as the co-operating base station becomes the new serving base station. However as mentioned above, it may be preferable to maintain the co-operating set even though th hand over condition is satisfied.

Signalling

As mentioned above FIG. 4 provides an illustration for explaining the options for communicating signalling messages in accordance with the present technique. There are two options for communicating the signalling messages which are required. As shown in FIG. 4 signalling messages may be communicated as dedicated signalling messages via the C-plane, in which case the serving base station 2.5 communicates the signalling messages to the MME 8 via the S1_MME interface. The MME 8 may then make a decision to establish a dedicated sub-bearer from the serving gateway 6 to the co-operating base station 2.3, 2.4, which is signalled to the serving gateway 6 via the S11 interface 40. Thus the two headed arrows 40, 42 shown in FIG. 4 represent the communication of signalling messages via the C-plane. Alternatively, signalling messages providing measurement reports from the serving gateway 2.5 may be communicated via in-band signalling messages via the U-plane to the serving gateway via the S1_u interface 44 and the S11 interface respectively using C-plane message 40. Thus, the two headed arrow 44 shown in FIG. 4 is representative of signalling messages between the serving base station and the serving gateway via the U-plane in order to perform measurement of reports of the link quality between the serving base station and the communications terminal as well as the co-operating base station and the communications terminal and to report these measurements to the MME 8. The MME 8 then coordinates with the serving gateway 6 by communicating signalling messages via the interface 40.

Configuration of the Mobile Communications Network

As will be appreciated there are various locations in the mobile communications network at which the decision can be taken to establish the sub-bearer from the serving gateway 6 to the co-operating base station 2.3. Generally the mobile communications network is configured to monitor respectively the state of the radio communications channel between the serving base station 2.5 and the communications terminal 1.1 and the co-operating base station 2.3 and the communications terminal 1.1 and depending on the state of the radio communications channels between the serving base station, the co-operating base station and the communications terminal select one or both of the serving base station and the co-operating base station to communicate the user data to the communications terminal. Depending upon the selection, the mobile communications network can communicate selectively the user data via the communications bearer established with the co-operating base station or via the communications bearer to the serving base station.

In one example, the core network part of the mobile communications network includes a serving gateway, the serving gateway being configured to communicate selectively the data via the communications bearer establish with the co-operating base station or via the communications bearer to the serving base station. As such the decision to communicate the user data to the serving base station 2.5 or the co-operating base station 2.3 is made by the serving gateway 6. Alternatively the user data could be sent to all of the co-operating base stations and the serving base station.

In another example, the core network part of the mobile communications network includes a mobility manager entity (MME) 8 and a serving gateway 6 and the serving base station 2.5 may be configured to receive an indication of a relative state of the radio communications link between the co-operating base station 2.3 and the communications terminal 1.1, and to receive an indication of a relative state of the radio communications link between the serving base station 2.5 and the communications terminal 1.1. Furthermore the MME 8 in combination with the serving base station 2.5 may be configured to identify whether to establish the communications bearer to the co-operating base station 2.3 depending on the predetermined conditions satisfied.

As will be appreciated, in order for the MME 8 to determine whether to establish the sub-bearer from the serving gateway 6 to the co-operating base station 2.5, the reports on the state of the radio communications link between the serving base station and the communications terminal and the co-operating base station and the communications terminal need to be communicated typically from the serving base station to the MME 8. To this end, in one example, the serving base station may be configured to communicate an indication of the state of radio communications channels between the serving base station, the co-operating base station and the communications terminal via in band signalling. For the example of an LTE communications network the indications of the state of the communications channel may be communicated on the S1-u interface, so that the serving gateway may be configured to determine whether to communicate the user data to the communications terminal via one of the communications bearers to the serving or the co-operating base stations for communicating to the communications terminal.

Operating of a Co-Operating Set

As explained above, embodiments of the present invention are arranged to analyse a profile of the user data which is transmitted via each of the one or more co-operating base stations for each of the communications bearers which are provided to a communications terminal. In one example the mobile communications network is configured to establish a sub-bearer from the serving gateway to the co-operating base station for each of the communications bearers which are delivering data to the communications terminal, which are considered separately and conditioned on whether or not the pre-determined conditions are satisfied for each of the communications bearers. As such, if for example, there were a plurality of communications bearers established for a communications terminal, then one or more of those communications bearers utilise one or more of the co-operating base stations of the co-operating set, whilst others of the communications bearers may be served by the serving base station only. Of the one or more communications bearers which are implemented by communicating data via one or more of the co-operating base stations, each is considered separately with respect to the predetermined conditions for establishing a sub-bearer from the serving gateway to the co-operating base station, and the sub-bearer is established or not depending on the comparison.

In one example, the determination as to whether or not to establish a sub-bearer is made at a mobility manager of the mobile communications network, with the serving base station operating to report measurements of data communicated using one or more of the co-operating base stations of the set. In one example the serving base station may only report measurements for communications bearers which utilise one or more of the co-operating base stations and which satisfy the predetermined conditions, for example the radio communications conditions change frequently. The mobility manager may take a decision as to whether to establish the sub-bearer to a co-operating base station. In another example, only information about communications bearers which do not change are reported to the mobility manager.

As will be appreciated, in some examples communications bearer for communicating data to the communications terminals via co-operating base stations may use the interface between the co-operating base stations and the serving base station to transmit the user data (U-Plane data) to the co-operating base stations, whereas some communications bearers may use direct sub-bearers between the co-operating base stations and the serving gateway in addition to the communications bearer (S-1) which is established between the serving base station and the serving gateway.

Summary of Operation

Figure 6:
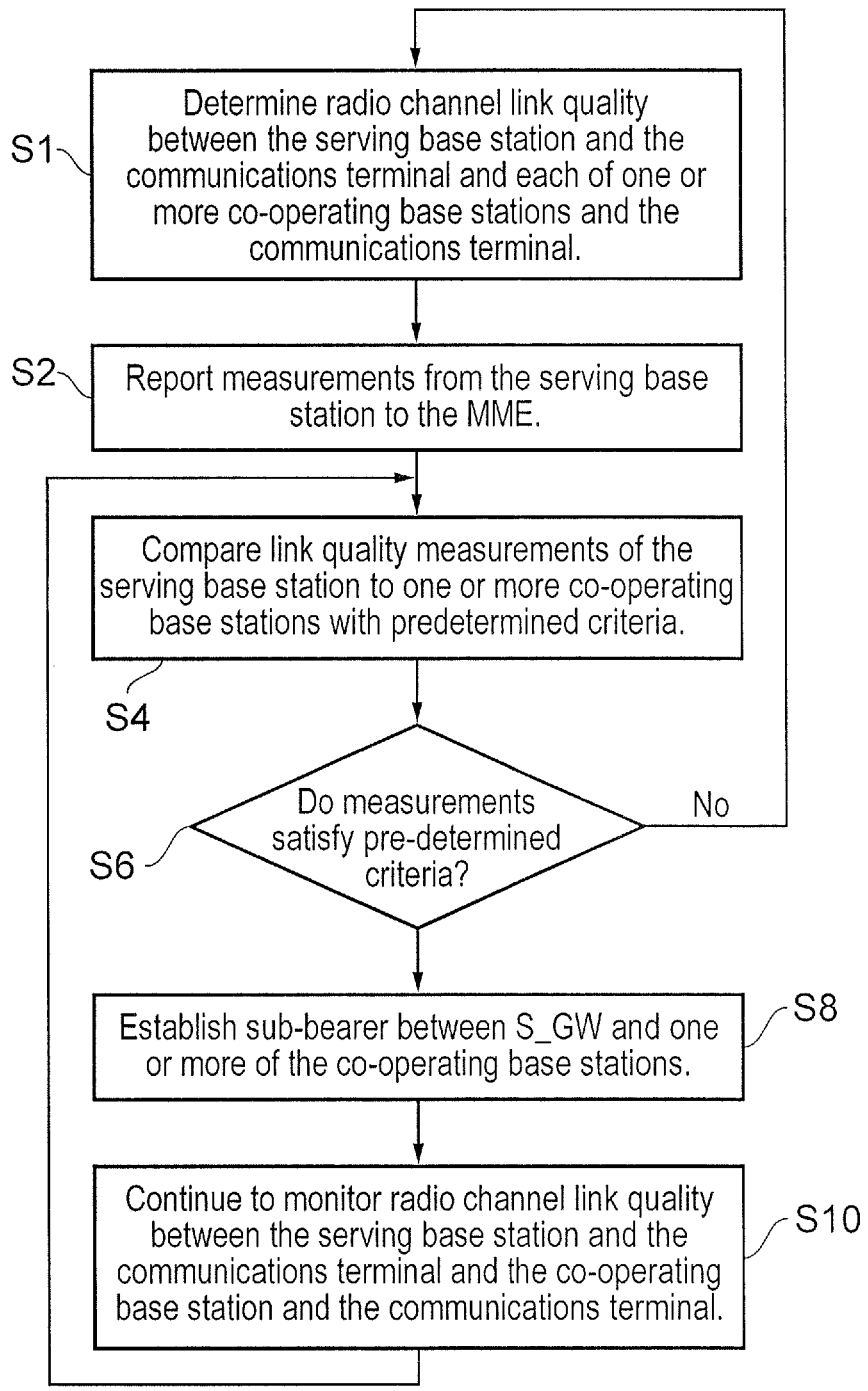
FIG. 6 provides a flow diagram representing the operation of the mobile communications network in providing the co-operating set in accordance with an example embodiment using C-plane signalling.

FIG. 6 provides a flow diagram providing a representation of one example of the operation of the present technique to establish sub-bearers, using C-plane signalling from the serving gateway to one or more of the co-operating base stations of a co-operating set using one or more of the example pre-determined conditions mentioned above or indeed other pre-determined conditions. FIG. 6 is summarised as follows:

S1: In accordance with a conventional arrangement the communications terminal reports link quality measurements from the serving base station and also from the co-operating base stations in the co-operating set. The link quality measurements are reported to the serving base station. In one example, the link quality measurements are then communicated to the MME 8 in step S2.

S4: The MME then compares the link quality measurements of the serving base station with those of one or more of the co-operating base stations within the co-operating set with pre-determined criteria. In accordance with these pre-determined criteria it is determined whether or not it would be more efficient to communicate the user data directly to one or more of the co-operating base stations of the co-operating set. These criteria effectively determine that time for which the ready communications link quality is better via the co-operating base station then the serving base station is greater than a time required to set up the sub-bearer but less than a time for which it would be better to perform a handover from the serving base station to the co-operating base station. the signal effectively. FIG. 6 is for the C-Plane. Can we have similar figure for the U-Plane and switching? We have here this in band options that the S-GW gets notified (the SGW may notify the MME) Alternatively the MME gets notified and then the S-GW is notified. The former is better is bearers are already established and the switching is required. The latter is better if we need to establish a new bearers to the co-operating eNBs. However the former can also be used in this scenario.

S6: The MME then determines whether the measurements of the link quality satisfy the pre-determined criteria for one or more of the base stations of the co-operating set. S8 if the link quality measurements do satisfy the link quality measurements for one or more of the co-operating base stations then the MME signals the eNb and serving gateway 6 to establish an S1U bearer between the serving gateway and the co-operating base station for communicating the user data directly to the co-operating base station which has been referred to in the above explanation as the sub-bearer.

S10: The MME continues to monitor the radio communications link quality between the serving base station and the communications terminal and the co-operating base station and the communications terminal. If, for example, the link quality of the co-operating base station then remains above that of the serving base station then the MME may decide to execute a handover to the co-operating base station. On the contrary, the MME then may re-accesses the link quality measurements and if these are below a pre-determined threshold consistently for a pre-determined amount of time then the MME may apply the decision question S6 to determine to tear down or cancel the sub-bearer. But typically as the bearers are already established they may also be kept but not used for a time being.

Figure 7:
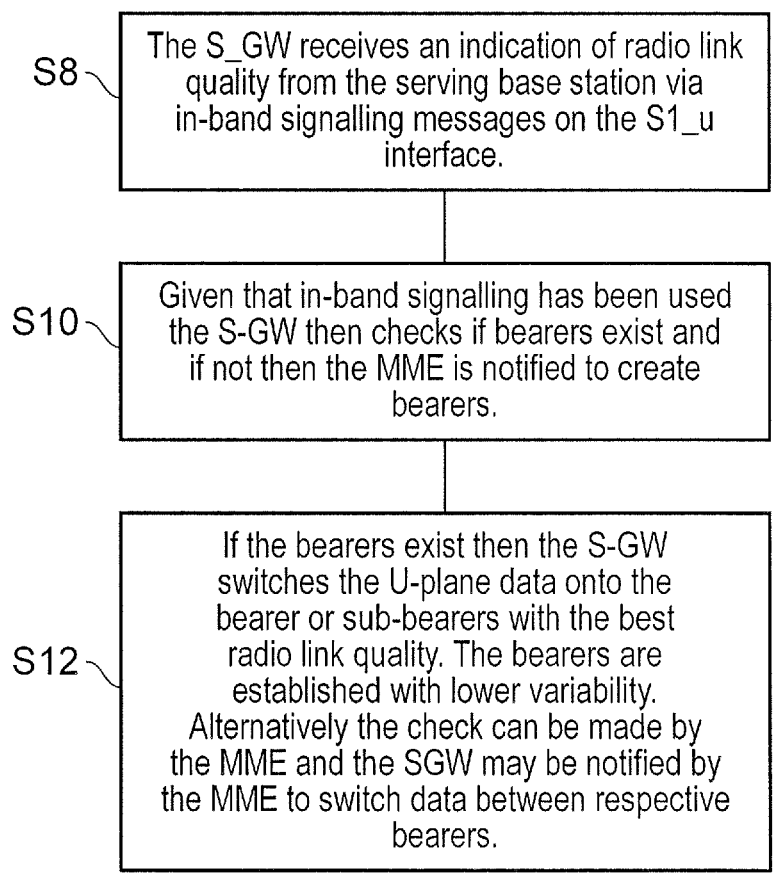
FIG. 7 provides a flow diagram representing the operation of the mobile communications network as presented in FIG. 6 but modified to include U-plane signalling.

An example of the U-plane operation is represented in FIG. 7. FIG. 7 is summarised as follows:

S8: The serving gateway receives an indication about radio link quality from the serving base station. This may be received via in-band signalling messages on the SI_u interface from the serving base station.

S10: If in band signalling is used, the serving gateway checks if bearers exist and if not the MME is notified to create bearers.

S12: If the bearers exist then the serving gateway switches the U-Plane data onto the bearer or sub-bearers with the best radio link quality. The sub-bearers are established for communications bearers with lower variability. Alternatively the check can be made by the MME and the serving gateway may be notified by the MME to switch the data between the respective bearers. Inband signalling may be better for only switching the data between the S1 communications bearer to the serving gateway or the sub-bearer to the co-operating base station. However the signalling with the MME may be better if new bearers need to be established.

As will be appreciated from the above explanation, embodiments of the present invention can include:

A mobile communications network for communicating data to and/or from one or more communications terminals, the mobile communications network comprises a core network part, and a radio network part including a plurality of base stations which are configured to provide a wireless access interface for communicating the data to or from the communications terminals. One of the plurality of base stations is configured to operate as a serving base station to one of the communications terminals, to establish in co-operation with the communications terminal one or more communications bearers for communicating user data to or from the communications terminal via the core network part and the radio network part via the serving base station, and to co-operate with at least one other of the plurality of base stations to communicate the user data to or from the communications terminal. The co-operating base station is configured to transmit the user data to the communications terminal consequent upon a state of a radio communications channel established via the wireless access interface. The mobile communications network is configured to monitor a state of the radio communications channel between the co-operating base station and the communications terminal, and consequent upon predetermined conditions, to establish a communications bearer from the core network to the co-operating base station for communicating the user data to the co-operating base station for transmitting the user data to the communications terminal.

In a mobile communications network according to the above embodiment, the predetermined conditions may include at least one of the state of the radio communications channel between the co-operating base station and the communications terminal, a set-up time for establishing the communications bearer between the co-operating base station and the communications terminal and a quality of service which is required to communicate the user data to the communications terminal.

A base station forms part of a mobile communications network, which is configured to communicate user data to communications terminals and receive user data from the communications terminals via at least one communications bearer established via a wireless access interface. The communications bearer includes a radio communications channel provided by the wireless access interface, to operate as a serving base station to one of the communications terminals, and to co-operate with at least one other of the plurality of base stations to communicate the user data to or from the communications terminal, by transmitting the user data for communicating to the communications terminal via an interface between the serving base station and the co-operating base station, monitoring a state of the radio communications channel between the serving base station and the communications terminal and the co-operating base station and the communications terminal, reporting the state of the radio communications channel between the serving base station and the communications terminal and the co-operating base station and the communications terminal to the core network, and consequent upon receiving an indication that the core network has established a separate communications bearer to the co-operating base station for communicating the user data to the co-operating base station for transmitting the user data to the communications terminal, to stop communicating the user data to the co-operating base station via the interface between the serving base station and the co-operating base station.

A base station forms part of a mobile communications network, which is configured to communicate user data to communications terminals and receive user data from the communications terminals via at least one communications bearer established via a wireless access interface. The communications bearer includes a radio communications channel provided by the wireless access interface, to operate as a co-operating base station with a serving base station for one of the communications terminals, by receiving the user data for communicating to the communications terminal from the serving base station via an interface between the serving base station and the co-operating base station, and transmitting the user data selectively to the communications terminal consequent upon a state of a radio communications channel established via the wireless access interface under the control of the serving base station, and establishing with the mobile communications network a communications bearer from the core network to the co-operating base station for communicating the user data to the co-operating base station for transmitting the user data to the communications terminal, without the receiving the user data from the serving base station.

An infrastructure equipment forms part of a mobile communications network, which includes a core network part which includes the infrastructure equipment and a radio network part, which includes a plurality of base stations which are configured to provide a wireless access interface for communicating the data to or from the communications terminals. The infrastructure equipment is configured to receive an indication of a relative state of the radio communications link between a co-operating base station and a communications terminal, to receive an indication of a relative state of the radio communications link between a serving base station and the communications terminal, the co-operating base station and the serving base station forming a co-operating set of base stations, to identify whether to establish the communications bearer to the co-operating base station depending on the predetermined conditions, and consequent upon the predetermined conditions being satisfied, to establish the communications bearer for communicating the user data from the serving gateway to the co-operating base station for communication to the communications terminal.

In an infrastructure equipment as explained above, the predetermined conditions include at least one of the state of the radio communications channel between the co-operating base station and the communications terminal, a set-up time for establishing the communications bearer between the co-operating base station and the communications terminal and a quality of service which is required to communicate the user data to the communications terminal.

In an infrastructure equipment as explained above, the serving base station is configured to communicate an indication of the state of radio communications channel established with the communications terminal via each of the serving base station and the co-operating base station to the serving gateway via in band signalling.

A communications terminal for communicating data to or receiving data from a mobile communications network is configured to establish in co-operation with the mobile communications network a communications bearer for communicating data for a communications session from or to the mobile communications device via the communications bearer, the communications bearer including a radio communications channel between the communications terminal and a serving base station of the mobile communications network, and to receive the data from a serving base station of the mobile communications network via a radio communications channel between the serving base station and the communications terminal. The serving base station forms with at least one other co-operating base station a co-operating set, and the communications terminal is configured to determine a state of the radio communications channel between the serving base station and the communications terminal and between the co-operating base station and the communications terminal, to communicate the determined state of the radio communications channel between the serving base station and the co-operating base station and the communications terminal to the serving base station, to receive the user data selectively from one or both of the serving base station or the co-operating base station consequent upon the communicated state of a radio communications channel established via the wireless access interface under the control of the serving base station, and consequent upon predetermined conditions, to receive the user data from the co-operating base station, which has been communicated to the co-operating base station using a communications bearer established from the core network to the co-operating base station for communicating the user data to the co-operating base station for transmitting the user data to the communications terminal.

In a communications terminal as explained above, the predetermined conditions include at least one of the state of the radio communications channel between the co-operating base station and the communications terminal, a set-up time for establishing the communications bearer between the co-operating base station and the communications terminal and a quality of service which is required to communicate the user data to the communications terminal.

A method of communicating data to a communications terminal via a mobile communications network, the mobile communications network comprises a core network part including infrastructure equipment, and a radio network part including a plurality of base stations which are configured to provide a wireless access interface for communicating the data to the communications terminals. The method includes establishing in co-operation with the communications terminal one or more communications bearers for communicating user data to or from the communications terminal via the core network part and the radio network part via a serving base station, forming a co-operating set of base stations comprising the serving base station and at least one co-operating base station, monitoring a state of the radio communications channel between the co-operating base station and the communications terminal established via the wireless access interface, receiving user data at the co-operating base station via an interface between the serving base station and the co-operating base station, and transmitting the user data selectively to the communications terminal from the co-operating base station and/or the serving base station consequent upon a state of a radio communications channel under the control of the serving base station, and consequent upon predetermined conditions, establishing a communications bearer from the core network to the co-operating base station for communicating the user data to the co-operating base station for transmitting the user data to the communications terminal.

The following numbered clauses provide further example aspects and features of the present technique:

1. A mobile communications network for communicating data to and/or from one or more communications terminals, the mobile communications network comprising a core network part including infrastructure equipment, and a radio network part including a plurality of base stations which are configured to provide a wireless access interface for communicating the data to or from the communications terminals, wherein one of the plurality of base stations is configured to operate as a serving base station to one of the communications terminals, to establish in co-operation with the communications terminal one or more communications bearers for communicating user data to or from the communications terminal via the core network part and the radio network part via the serving base station, and to co-operate with at least one other of the plurality of base stations to communicate the user data to or from the communications terminal, the co-operating base station being configured to receive user data for communicating to the communications terminal via an interface between the serving base station and the co-operating base station, and to transmit the user data selectively to the communications terminal consequent upon a state of a radio communications channel established via the wireless access interface under the control of the serving base station, and the mobile communications network is configured to monitor a state of the radio communications channel between the co-operating base station and the communications terminal, and consequent upon predetermined conditions, to establish a communications bearer from the core network to the co-operating base station for communicating the user data to the co-operating base station for transmitting the user data to the communications terminal.

2. A mobile communications network according to clause 1, wherein the predetermined conditions include at least one of the state of the radio communications channel between the co-operating base station and the communications terminal, a set-up time for establishing the communications bearer between the co-operating base station and the communications terminal and a quality of service which is required to communicate the user data to the communications terminal.

3. A mobile communications network according to clause 1 or 2, wherein the mobile communications network is configured to monitor the state of the radio communications channel between the co-operating base station and the communications terminal, to determine a rate of change of the state of the radio communications channel between the co-operating base station and the communications terminal, and the predetermined conditions include a rate of change of the state of the communications channel, such that if the rate of change of the state of the radio communications channel between the co-operating base station and the communications terminal is below a predetermined rate, and the average is above a predetermined threshold, the communications bearer between the co-operating base station and the core network is established for communicating the user data to the communications terminal via the co-operating base station.

4. A mobile communications network according to clause 2 or 3, wherein the predetermined conditions include an integration time, which is a time for which the state of the radio communications link remains within a predetermined communications quality range.

5. A mobile communications network according to clause 4, wherein the integration time is determined in accordance with the set-up time, the set-up time including a time required to determine a current state of the radio communications link between the co-operating base station and the communications terminal, to communicate the current state of the radio communications link to the core network part, and a time required to establish the communications bearer to the co-operating base station.

6. A mobile communications network according to clause 4 or 5, wherein the integration time is a function of the quality of service required to communicate the user data to the communications terminal.

7. A mobile communications network according to any preceding clause, wherein the mobile communications network is configured to monitor respectively the state of the radio communications channel between the serving base station and the communications terminal and the co-operating base station and the communications terminal, depending on the state of the radio communications channels between the serving base station and the co-operating base station and the communications terminal to select one or both of the serving base station and the co-operating base station to communicate the user data to the communications terminal, and depending upon the selection, to communicate selectively the user data via the communications bearer established with the co-operating base station or via the communications bearer to the serving base station.

8. A mobile communications network according to clause 7, wherein the core network part of the mobile communications network includes a serving gateway, the serving gateway being configured to communicate selectively the data via the communications bearer establish with the co-operating base station or via the communications bearer to the serving base station.

9. A mobile communications network according to any preceding clause, wherein the core network part includes a mobility manager and a serving gateway and the serving base station is configured to receive an indication of a relative state of the radio communications link between the co-operating base station and the communications terminal, and to receive an indication of a relative state of the radio communications link between the serving base station and the communications terminal, and the mobility manager in combination with the serving base station is configured to identify whether to establish the communications bearer to the co-operating base station depending on the predetermined conditions, and consequent upon the predetermined conditions being satisfied, to establish the communications bearer for communicating the user data from the serving gateway to the co-operating base station for communication to the communications terminal.

10. A mobile communications network according to clause 9, wherein the serving base station is configured to communicate an indication of the state of radio communications channel established with the communications terminal via each of the serving base station and the co-operating base station to the serving gateway via in band signalling.

11. A mobile communications network for communicating data to and/or from one or more communications terminals, the mobile communications network comprising
a core network part, and
a radio network part including a plurality of base stations which are configured to provide a wireless access interface for communicating the data to or from the communications terminals, wherein one of the plurality of base stations is configured
to operate as a serving base station to one of the communications terminals,
to establish in co-operation with the communications terminal one or more communications bearers for communicating user data to or from the communications terminal via the core network part and the radio network part via the serving base station, and
to co-operate with at least one other of the plurality of base stations to communicate the user data to or from the communications terminal, the co-operating base station being configured
to transmit the user data to the communications terminal consequent upon a state of a radio communications channel established via the wireless access interface, and the mobile communications network is configured
to monitor a state of the radio communications channel between the co-operating base station and the communications terminal, and
consequent upon predetermined conditions, to establish a communications bearer from the core network to the co-operating base station for communicating the user data to the co-operating base station for transmitting the user data to the communications terminal.

12. A mobile communications network according to clause 11, wherein the predetermined conditions include at least one of the state of the radio communications channel between the co-operating base station and the communications terminal, a set-up time for establishing the communications bearer between the co-operating base station and the communications terminal and a quality of service which is required to communicate the user data to the communications terminal.

13. A base station for forming part of a mobile communications network, the base station being configured
to communicate user data to communications terminals and receive user data from the communications terminals via at least one communications bearer established via a wireless access interface, the communications bearer including a radio communications channel provided by the wireless access interface,
to operate as a serving base station to one of the communications terminals, and
to co-operate with at least one other of the plurality of base stations to communicate the user data to or from the communications terminal, by
transmitting the user data for communicating to the communications terminal via an interface between the serving base station and the co-operating base station,
monitoring a state of the radio communications channel between the serving base station and the communications terminal and the co-operating base station and the communications terminal,
reporting the state of the radio communications channel between the serving base station and the communications terminal and the co-operating base station and the communications terminal to the core network, and
consequent upon receiving an indication that the core network has established a separate communications bearer to the co-operating base station for communicating the user data to the co-operating base station for transmitting the user data to the communications terminal, to stop communicating the user data to the co-operating base station via the interface between the serving base station and the co-operating base station.

14. A base station for forming part of a mobile communications network, the base station being configured
to communicate user data to communications terminals and receive user data from the communications terminals via at least one communications bearer established via a wireless access interface, the communications bearer including a radio communications channel provided by the wireless access interface,
to operate as a co-operating base station with a serving base station for one of the communications terminals, by
receiving the user data for communicating to the communications terminal from the serving base station via an interface between the serving base station and the co-operating base station, and
transmitting the user data selectively to the communications terminal consequent upon a state of a radio communications channel established via the wireless access interface under the control of the serving base station, and
establishing with the mobile communications network a communications bearer from the core network to the co-operating base station for communicating the user data to the co-operating base station for transmitting the user data to the communications terminal, without the receiving the user data from the serving base station.

15. An infrastructure equipment for forming part of a mobile communications network, the mobile communications network including a core network part which includes the infrastructure equipment and a radio network part, which includes a plurality of base stations which are configured to provide a wireless access interface for communicating the data to or from the communications terminals, wherein the infrastructure equipment is configured
to receive an indication of a relative state of the radio communications link between a co-operating base station and a communications terminal,
to receive an indication of a relative state of the radio communications link between a serving base station and the communications terminal, the co-operating base station and the serving base station forming a co-operating set of base stations,
to identify whether to establish the communications bearer to the co-operating base station depending on the predetermined conditions, and
consequent upon the predetermined conditions being satisfied, to establish the communications bearer for communicating the user data from the serving gateway to the co-operating base station for communication to the communications terminal.

16. An infrastructure equipment according to clause 15, wherein the predetermined conditions include at least one of the state of the radio communications channel between the co-operating base station and the communications terminal, a set-up time for establishing the communications bearer between the co-operating base station and the communications terminal and a quality of service which is required to communicate the user data to the communications terminal.

17. An infrastructure equipment according to clause 15, wherein the serving base station is configured to communicate an indication of the state of radio communications channel established with the communications terminal via each of the serving base station and the co-operating base station to the serving gateway via in band signalling.

18. A communications terminal for communicating data to or receiving data from a mobile communications network, the mobile communications terminal being configured to establish in co-operation with the mobile communications network a communications bearer for communicating data for a communications session from or to the mobile communications device via the communications bearer, the communications bearer including a radio communications channel between the communications terminal and a serving base station of the mobile communications network, and to receive the data from a serving base station of the mobile communications network via a radio communications channel between the serving base station and the communications terminal, wherein the serving base station forms with at least one other co-operating base station a co-operating set, and the communications terminal is configured to determine a state of the radio communications channel between the serving base station and the communications terminal and between the co-operating base station and the communications terminal, to communicate the determined state of the radio communications channel between the serving base station and the co-operating base station and the communications terminal to the serving base station, to receive the user data selectively from one or both of the serving base station or the co-operating base station consequent upon the communicated state of a radio communications channel established via the wireless access interface under the control of the serving base station, and consequent upon predetermined conditions, to receive the user data from the co-operating base station, which has been communicated to the co-operating base station using a communications bearer established from the core network to the co-operating base station for communicating the user data to the co-operating base station for transmitting the user data to the communications terminal.

19. A communications terminal according to clause 18, wherein the predetermined conditions include at least one of the state of the radio communications channel between the co-operating base station and the communications terminal, a set-up time for establishing the communications bearer between the co-operating base station and the communications terminal and a quality of service which is required to communicate the user data to the communications terminal.

20. A method of communicating data to a communications terminal via a mobile communications network, the mobile communications network comprising a core network part including infrastructure equipment, and a radio network part including a plurality of base stations which are configured to provide a wireless access interface for communicating the data to the communications terminals, the method comprising establishing in co-operation with the communications terminal one or more communications bearers for communicating user data to or from the communications terminal via the core network part and the radio network part via a serving base station, forming a co-operating set of base stations comprising the serving base station and at least one co-operating base station, monitoring a state of the radio communications channel between the co-operating base station and the communications terminal established via the wireless access interface, receiving user data at the co-operating base station via an interface between the serving base station and the co-operating base station, and transmitting the user data selectively to the communications terminal from the co-operating base station and/or the serving base station consequent upon a state of a radio communications channel under the control of the serving base station, and consequent upon predetermined conditions, establishing a communications bearer from the core network to the co-operating base station for communicating the user data to the co-operating base station for transmitting the user data to the communications terminal.

Various further aspects and features of the present invention are defined in the appended claims. Various modifications may be made to the described embodiments without departing from the scope of the present invention and defined in the appending claims. For example, embodiments of the present invention filed application with other communication systems other than 3GPP and other then the LTE standards. Furthermore, it would be appreciated that the decision criteria could be taken anywhere in the communications network and not just in the MME but maybe in the serving gateway and a different arrangement of signalling maybe implemented other than that specified above.

The invention claimed is:

1. A communications terminal for communicating data with a communications network, the communications terminal comprising:

processing circuitry configured to establish, in co-operation with the communications network, a communications bearer for communicating the data, the communications bearer including a radio communications channel between the communications terminal and a serving base station of the communications network; and receive the data from the serving base station via the radio communications channel, wherein the serving base station forms a co-operating set with a co-operating base station, and to receive the data, the processing circuitry is configured to determine a first state of the radio communications channel between the serving base station and the communications terminal and a second state of a second radio communications channel between the co-operating base station and the communications terminal;

communicate the determined first and second states to the serving base station;

receive the data selectively from one or both of the serving base station or the co-operating base station, based on the first and second states, via a wireless access interface under the control of the serving base station;

determine a rate of change of the second state of the second radio communications channel between the co-operating base station and the communications terminal; and receive, based on predetermined conditions, data from the co-operating base station, the co-operating base station having received the data via a second communications bearer, wherein the predetermined conditions include the rate of change of the second state of the second communications channel, the second communications bearer is established from the communications network to the co-operating base station, and the second communications bearer is for communicating the data to the co-operating base station.

2. The communications terminal as claimed in claim 1, wherein the predetermined conditions include at least one of the second state of the second radio communications channel between the co-operating base station and the communications terminal, a set-up time for establishing the second communications bearer between the co-operating base station and the communications terminal and a quality of service which is required to communicate the data to the communications terminal.

3. The communications terminal as claimed in claim 2, wherein the predetermined conditions include an integration time, which is a time for which the second state is within a predetermined communications quality range.

4. The communications terminal as claimed in claim 3, wherein the processing circuitry determines the integration time in accordance with the set-up time, the set-up time including a time required to determine a current state of the second radio communications channel and a time required to establish the second communications bearer to the co-operating base station.

5. The communications terminal as claimed in claim 3, wherein the integration time is a function of a quality of service required to communicate the data to the communications terminal.

6. The communications terminal as claimed in claim 1, wherein the communications terminal is configured to monitor the second state of the second radio communications channel between the co-operating base station and the communications terminal, and when the rate of change is below a predetermined rate, and an average is above a predetermined threshold, the second communications bearer between the co-operating base station and the communications network is established for communicating the data to the communications terminal via the co-operating base station.

7. A method of communicating data via a communications network, the communications network comprising a core network part including infrastructure equipment, and a radio network part including a plurality of base stations which are configured to provide a wireless access interface for communicating the data to a communications terminal, the method comprising:

establishing, by processing circuitry of the communications terminal and in co-operation with the communications network, a communications bearer for communicating the data, the communications bearer including a radio communications channel between the communications terminal and a serving base station of the communications network; and receiving, by the processing circuitry, the data from the serving base station via the radio communications channel, wherein the serving base station forms a co-operating set with a co-operating base station, and the receiving includes:

determining a first state of the radio communications channel between the serving base station and the communications terminal and a second state of a second radio communications channel between the co-operating base station and the communications terminal;

communicating the determined first and second states to the serving base station;

receiving the data selectively from one or both of the serving base station or the co-operating base station, based on the first and second states, via the wireless access interface under the control of the serving base station;

determining a rate of change of the second state of the second radio communications channel between the co-operating base station and the communications terminal; and receiving, based on predetermined conditions, data from the co-operating base station, the co-operating base station having received the data via a second communications bearer, wherein the predetermined conditions include the rate of change of the second state of the second communications channel, the second communications bearer is established from the core network to the co-operating base station, and the second communications bearer is for communicating the data to the co-operating base station.

8. The method as claimed in claim 7, wherein the predetermined conditions include at least one of the second state of the second radio communications channel between the co-operating base station and the communications terminal, a set-up time for establishing the second communications bearer between the co-operating base station and the communications terminal and a quality of service which is required to communicate the data to the communications terminal.

9. The method as claimed in claim 8, wherein the predetermined conditions include an integration time, which is a time for which the second state is within a predetermined communications quality range.

10. The method as claimed in claim 9, further comprising determining the integration time in accordance with the set-up time, the set-up time including a time required to determine a current state of the second radio communications channel and a time required to establish the second communications bearer to the co-operating base station.

11. The method as claimed in claim 9, wherein the integration time is a function of a quality of service required to communicate the data to the communications terminal.

12. The method as claimed in claim 7, further comprising monitoring the second state of the second radio communications channel between the co-operating base station and the communications terminal, wherein when the rate of change is below a predetermined rate, and an average is above a predetermined threshold, the second communications bearer between the co-operating base station and the core network is established for communicating the data to the communications terminal via the co-operating base station.

* * * * *